US011220377B2

(12) United States Patent
Fratantoni

(10) Patent No.: US 11,220,377 B2
(45) Date of Patent: Jan. 11, 2022

(54) POWDER DISPENSING SYSTEM

(71) Applicant: Vincent Fratantoni, Scottsdale, AZ (US)

(72) Inventor: Vincent Fratantoni, Scottsdale, AZ (US)

( * ) Notice: Subject to any disclaimer, the term of this patent is extended or adjusted under 35 U.S.C. 154(b) by 0 days.

(21) Appl. No.: 16/776,045

(22) Filed: Jan. 29, 2020

(65) Prior Publication Data

US 2021/0139205 A1 May 13, 2021

Related U.S. Application Data

(60) Provisional application No. 62/932,999, filed on Nov. 8, 2019.

(51) Int. Cl.
*B65D 43/02* (2006.01)

(52) U.S. Cl.
CPC .................. *B65D 43/0225* (2013.01)

(58) Field of Classification Search
CPC ........ B65D 47/265; B65D 83/04; B67D 3/00; A47G 19/24; G01F 11/0003
USPC ................ 220/293; 222/481, 485, 548, 480; 206/538, 540, 533, 380
See application file for complete search history.

(56) References Cited

U.S. PATENT DOCUMENTS

| | | | | |
|---|---|---|---|---|
| 1,714,368 A * | 5/1929 | Hobson | ................ | B65D 47/263 |
| | | | | 222/553 |
| 1,752,720 A | 4/1930 | Bergelson | | |
| 1,775,959 A * | 9/1930 | Himes | ................. | B65D 47/263 |
| | | | | 206/540 |
| 2,774,466 A * | 12/1956 | Liska | ................... | B65D 47/263 |
| | | | | 206/538 |
| 2,877,937 A | 3/1959 | Weir | | |
| 3,211,334 A | 10/1965 | Mcshea | | |
| 3,327,905 A * | 6/1967 | Gould | .................... | A47G 19/34 |
| | | | | 222/331 |
| 4,032,050 A | 6/1977 | Funk | | |

(Continued)

OTHER PUBLICATIONS

Fit & Fresh Jaxx Powder Pack, Convenient Container for Taking Protein Powder and Supplements On The Go (n.d.). Retreived Jan. 16, 2020, from https://www.amazon.com/Fit-Fresh-Convenient-Container-Supplements/dp/B00AY3RND0.

(Continued)

*Primary Examiner* — J. Gregory Pickett
*Assistant Examiner* — Tia Cox
(74) *Attorney, Agent, or Firm* — Dunlap Bennett & Ludwig, PLLC

(57) ABSTRACT

A dispensing system for a container is provided. The dispensing system operatively associates a lid assembly with the container. The dispensing system rotatably attaches a septum portion having two septum apertures to an opening of the container. Rotatably associated with and relative to the septum portion is a baffle portion of the lid assembly. The baffle portion provides two baffle apertures, each coextensive with the spaced apart septum apertures so that the baffle portion is movable between a closed position and an open position fluidly communicating the container and an enclosure of the lid assembly. The enclosure may be divided in half with each half providing a cover selectively movable between a retaining condition and a pouring condition for pouring contents from each enclosure half.

6 Claims, 4 Drawing Sheets

(56) References Cited

U.S. PATENT DOCUMENTS

| | | | | |
|---|---|---|---|---|
| 4,127,190 | A | * | 11/1978 | Sunnen ............ A61J 7/04 116/216 |
| 4,164,301 | A | * | 8/1979 | Thayer ............ B65D 83/0454 206/534 |
| 4,203,518 | A | * | 5/1980 | Current ............ B65D 83/02 206/380 |
| 4,288,006 | A | * | 9/1981 | Clover, Jr. ............ B65D 47/265 206/534 |
| 4,429,815 | A | * | 2/1984 | Libit ............ B65D 47/265 222/452 |
| 4,674,660 | A | | 6/1987 | Botto |
| 4,892,233 | A | | 1/1990 | Zelickson |
| 5,495,962 | A | | 3/1996 | Nomura |
| 6,283,339 | B1 | * | 9/2001 | Morrow ............ G01F 23/24 222/142.9 |
| 6,601,734 | B1 | | 8/2003 | Smith |
| 7,874,420 | B2 | | 1/2011 | Coon |
| 8,033,422 | B2 | * | 10/2011 | Estrada ............ B65D 83/0454 221/89 |
| 8,875,892 | B1 | * | 11/2014 | Warner ............ A61J 1/03 206/533 |
| 8,936,157 | B1 | * | 1/2015 | Xu ............ B65D 47/265 206/533 |
| 9,828,230 | B2 | | 11/2017 | Ismail |
| D805,837 | S | | 12/2017 | Hager et al. |
| 10,203,235 | B1 | * | 2/2019 | Gottfried ............ B65D 51/245 |
| 2004/0026420 | A1 | * | 2/2004 | Smith ............ B65D 47/263 220/253 |
| 2005/0006273 | A1 | * | 1/2005 | Chawla ............ A61M 15/0028 206/533 |
| 2005/0205458 | A1 | * | 9/2005 | Pearson ............ B65D 83/04 206/538 |
| 2010/0200437 | A1 | | 8/2010 | Coon |
| 2014/0076937 | A1 | * | 3/2014 | Cavalier ............ B65D 47/265 222/481 |
| 2015/0197381 | A1 | | 7/2015 | Valenti et al. |
| 2016/0123786 | A1 | | 5/2016 | Hanna et al. |
| 2016/0159636 | A1 | | 6/2016 | Ismail |
| 2016/0244218 | A1 | * | 8/2016 | Carpenter ............ B65D 47/046 |
| 2017/0267440 | A1 | * | 9/2017 | Sanders ............ A61J 1/1412 |
| 2017/0296001 | A1 | | 10/2017 | Sharon et al. |
| 2018/0282032 | A1 | | 10/2018 | Teague |
| 2018/0368623 | A1 | | 12/2018 | Cerasani |

OTHER PUBLICATIONS

BlenderBottle ProStak Twist n' Lock Storage Jars Expansion z-Pak witn Pill Tray (n.d.) Retreived Jan. 16, 2020, from https://www.amazon.com/BlenderBottle-ProStak-Twist-Storage-Expansion/dp/B01LZEGPZP/ref=pd_sbs_79_t_0/136-2425202-4688740?_encoding=UTF8&pd_rd_i=B01LZEGPZP&pd_rd_i=78fe81eb-f63d-4f5f-9c71-2a5744229011&pd_rd_w=wT2CF&pd_rd_wg=Vw8Eo&pf_rd_p=5cfcfe89-300f-47d2-b1ad-a4eA27203a02a&pf_rd_r=QV11S6P521E2Z3DZ8E1G&psc=1&refRID=QV11S6P521E2Z3DZ8E1G.

EasyGo PRO (n.d.). Retrieved Jan. 16, 2020, from https://www.kickstarter.com/projects/1846757809/easygo-pro.

* cited by examiner

US 11,220,377 B2

POWDER DISPENSING SYSTEM

CROSS-REFERENCE TO RELATED APPLICATION

This application claims the benefit of priority of U.S. provisional application No. 62/932,999, filed 8 Nov. 2019, the contents of which are herein incorporated by reference.

BACKGROUND OF THE INVENTION

The present invention relates to powder dispensing devices and, more particularly, a dispensing system that selectively controls a desired, measured portion of a powder retained in an operatively associated container.

Scooping powder from a container can be annoying because a user needs to first locate the scooper inside a container, which may be buried by the powder. And if the user's hands are unclean then they are contaminating the contents inside the container when retrieving the device required to scoop it out—"the scooper". Moreover, when trying to scoop a precise amount, the powder can overflow the scooper and spill outside of the container. In other words, scooping powder does not work well because one is required to open up the container that's holding the powder, fish around the powder with one's hand in order to locate scooper, and carefully measure a precise amount of powder with the scooper in one hand and the container in the other. This is inconvenient to say the least, especially for people on the go and simultaneously juggling many responsibilities, which seems to be most people these days.

As can be seen, there is a need for a dispensing system that selectively controls a desired, measured portion of a powder retained in an operatively associated container, without the need for a scooper or any extrinsic device that could get buried by the powder or lost. The present invention facilitates dispensing a predetermined amount of powder from a container, and so enabling consumers to have an accurate amount of powder allocated per serving. All while providing a germ-free solution to measuring powder as there is no need to open the container and putting one's hand therein.

To use the present invention, a user does not need to open the container; rather, the user simply turns the container upside down, filling an operatively associated lid assembly through adjacent septum and baffle portion fluidly connected in an open condition. Then the user need only twist the lid assembly to move the baffle portion relative to a septum portion from the open position to a closed position, preventing any more powder from moving between the lid assembly and the container. Once the powder is in the lid assembly, a sidewall opening thereof may be selective opened to a pouring condition sot that the powder can flow from the lid assembly into another vessel, say a cup or a beverage container for consuming. Additionally, the lid assembly may be dimensioned and adapted to define a precise amount of powder therein.

The present invention is a solution that has not been done before. The present invention allows the consumer to easily fill the lid assembly of the container with contents to selectively distribute into a cup without the need of opening the lid assembly itself, thereby reducing the likelihood of germs entering the container. It is a lot easier to use than opening the container to locate a scooper therein, and then to scoop the powder into the cup.

SUMMARY OF THE INVENTION

In one aspect of the present invention, dispensing system for a container includes the following: a septum portion dimensioned to entirely cover an opening of the container but for two or more spaced apart septum apertures provided along the septum portion; and a lid assembly that includes the following: an enclosure defined by a baffle portion, a sidewall, and a transparent upper portion; the baffle portion providing two or more spaced apart baffle apertures fluidly connected to the enclosure, each baffle aperture coextensive one of the two or more spaced apart septum aperture; the lid assembly rotatably movable relative to the septum portion between a closed position and an open position wherein each baffle aperture aligns with one of the two or more spaced apart septum aperture; one or more wall openings provided along the sidewall and fluidly coupled to the enclosure; and an opening cover associated with each wall opening, each opening cover movable between a pouring condition and a retaining condition preventing a flow through the wall opening.

In another aspect of the present invention, the dispensing system for a container includes the following: a septum portion dimensioned to entirely cover an opening of the container but for two septum apertures provided along the septum portion; and a rim rotatably connecting the septum portion to the container; a lid assembly providing the following: an enclosure defined by a baffle portion, a sidewall, and a transparent upper portion; a divider extending between the baffle portion, the sidewall, and the transparent upper portion, wherein the divider divides the enclosure into two enclosure halves; the baffle portion providing two baffle apertures fluidly connected to the enclosure, the two baffle aperture coextensive with and similarly spaced apart as the two septum aperture; wherein the rim connects the lid assembly to the container by way of a lip along an upper inner periphery of the rim; the lid assembly rotatably movable relative to the septum portion between a closed position and an open position wherein the two baffle apertures align with the two septum apertures; a twist knob removably attachable to the transparent upper portion; two wall openings provided along the sidewall, each wall opening fluidly coupled one of the two enclosure halves; and an opening cover associated with each wall opening, each opening cover movable between a pouring condition and a retaining condition preventing a flow from the wall opening.

These and other features, aspects and advantages of the present invention will become better understood with reference to the following drawings, description and claims.

DETAILED DESCRIPTION OF THE INVENTION

Figure 1:
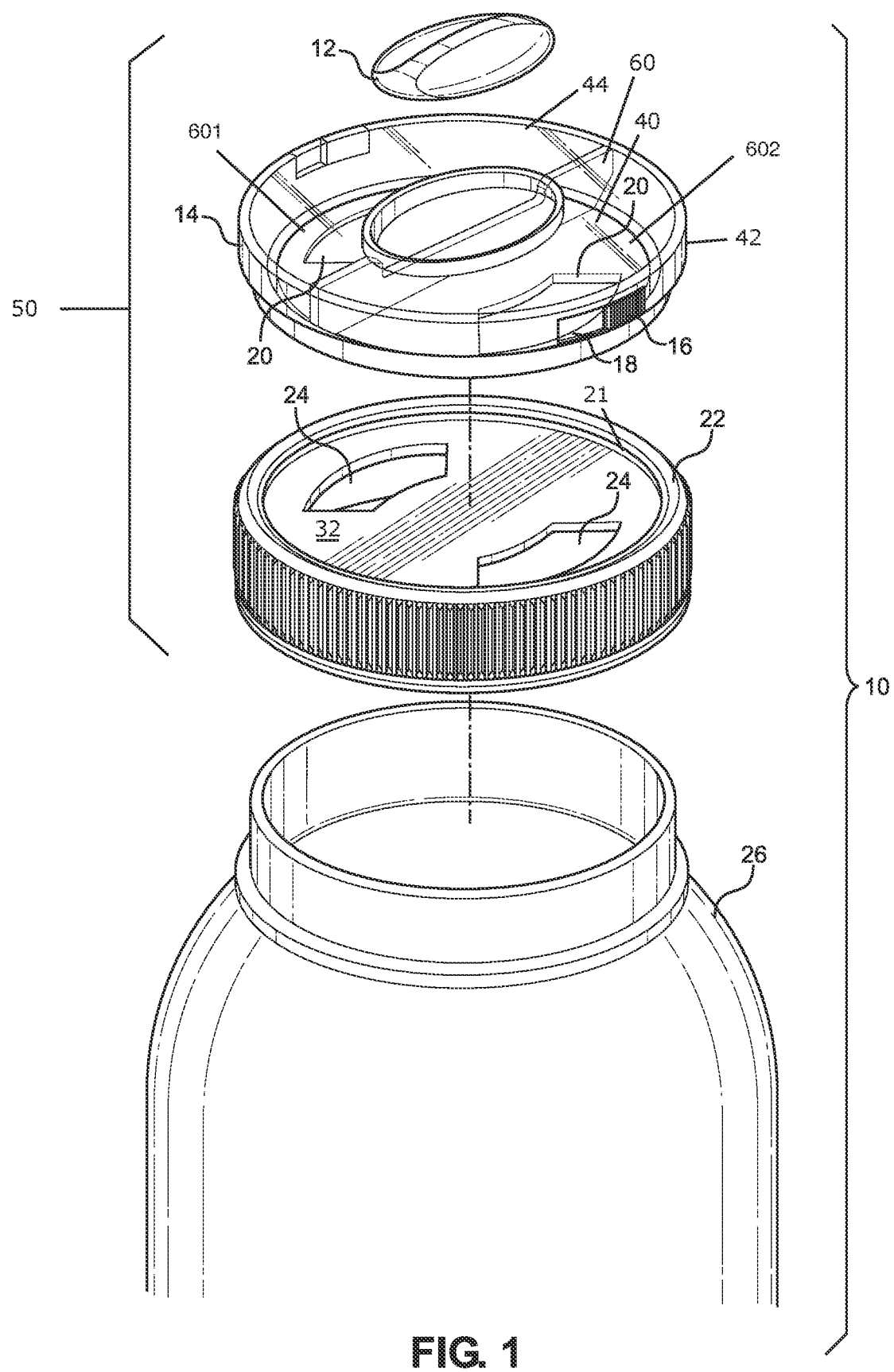
FIG. 1 is an exploded perspective view of an exemplary embodiment of the present invention.
Figure 2A:
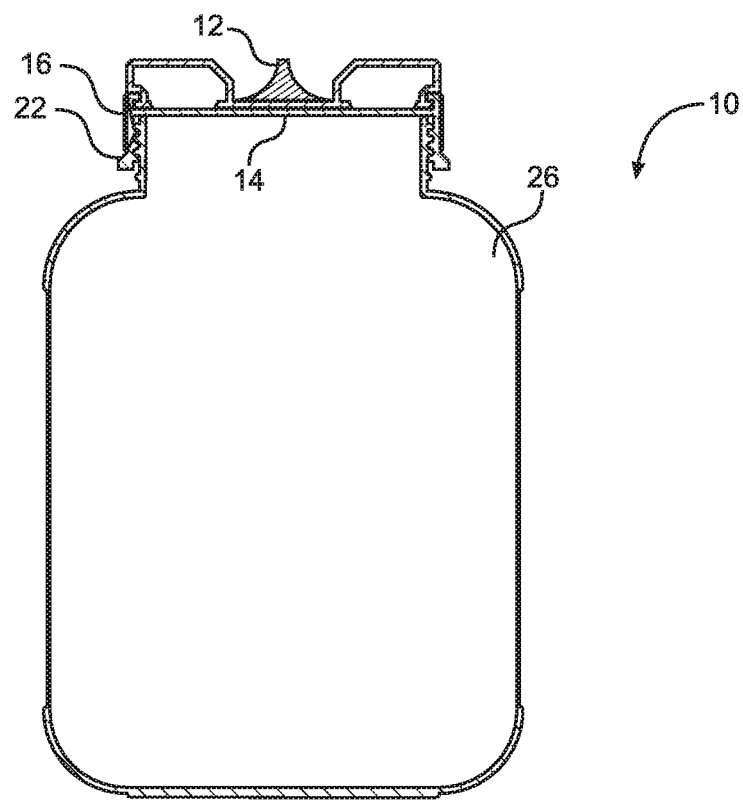
FIG. 2A is a cross section view of an exemplary embodiment of the present invention, illustrating a closed position.
Figure 2B:
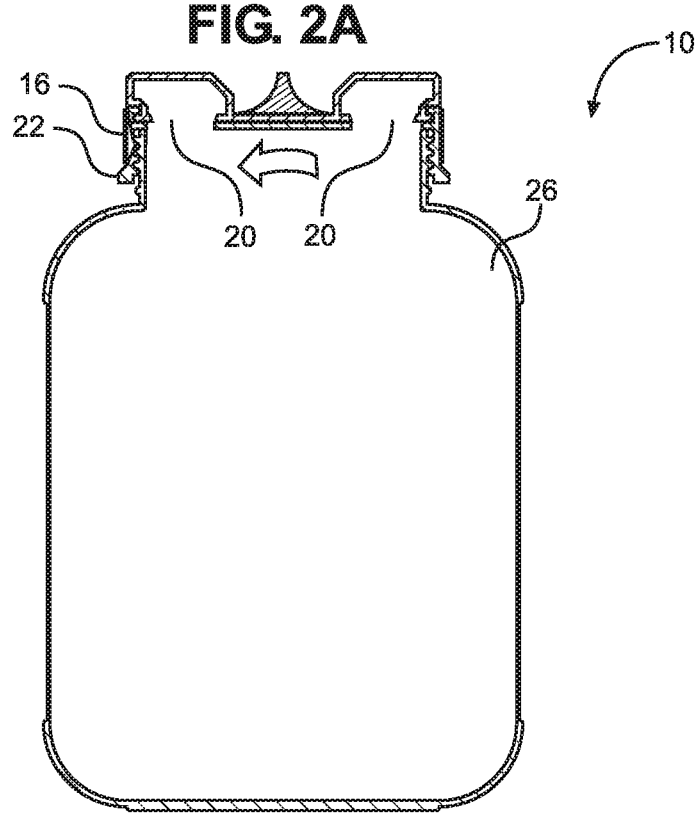
FIG. 2B is a cross section view of an exemplary embodiment of the present invention, illustrating an open position.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a dispensing system for a container that operatively associates a lid assembly with the container. The dispensing system rotatably attaches a septum portion having two septum apertures to an opening of the container. Rotatably associated with and relative to the septum portion is a baffle portion of the lid assembly. The baffle portion provides two baffle apertures, each coextensive with the spaced apart septum apertures so that the baffle portion is movable between a closed position and an open position fluidly communicating the container and an enclosure of the lid assembly. The enclosure may be divided in half with each half providing a cover selectively movable between a retaining condition and a pouring condition for pouring contents from each enclosure half.

It should be understood by those skilled in the art that the use of directional terms such as upper, lower, upward, downward, upright, top, left, right and the like are used in relation to the illustrative embodiments as they are depicted in the figures, the upward (or upper) direction being toward the top of the corresponding figures, while the downward (or lower) direction is toward the bottom of the corresponding figures, unless otherwise defined in the figure descriptions.

Referring to FIGS. 1 through 3F, the present invention may include a powder dispensing system 10 embodying a lid assembly 50 that operatively associates with a container 26 to selectively dispense powder or fluid therefrom.

The powder dispensing system 10 may include a septum portion 32 and a lid assembly system 10. The septum portion 32 may operatively associate with a threaded rim 22 to removably attached to and about an opening of the container 26. The septum portion 32 may include two spaced apart septum apertures 24 therethrough, wherein an aperture area of the two septum apertures 24 is less than the non-voided area septum 32.

The lid assembly 50 may include a lid portion 14 dimensioned and adapted to removably engage with the septum portion 32 by way of the treaded rim 22. Specifically, the threaded rim 22 may provide an upper lip 21 which a lower portion of the lid portion 14 rotatably engages so that the lid portion 14 can rotate relative to the septum portion 32.

The lid portion 14 may have an enclosure defined by a lower baffle portion 40, sidewalls 42, and a transparent upper portion 44. The baffle portion 40 may provide two spaced apart baffle apertures 20 that are fluidly connected to the enclosure. The baffle apertures 20 are coextensive with the two septum apertures 24 so that when the lid portion 14 is operatively associated with the septum portion 32, the baffle portion 40 can rotate relative the septum portion 20 until the baffle apertures 20 and the septum apertures 24 align, forming a fluid connection between the container 26 and the lid assembly 10 in an open position. Therefore, the enclosure is fillable by the contents 28 in the container 26. Likewise, the baffle portion 40 may be rotated relative to the septum portion 32 so that there is no fluid connection formed between the container 26 and the enclosure in a closed position (i.e., no overlap/alignment between the septum and baffle apertures 24 and 34). Furthermore, between the open position when the baffle apertures 20 and the septum apertures 24 fully align and the closed position there are various intermediate positions where the fluid connection is less than the open position, yet a fluid connection is present, whereby a user may selectively control the flow between the container 26 and the enclosure.

The septum portion 32 may be attached to the threaded rim 22, which is turn may be rotatably attached to the container 26 independent of the lid assembly 14. Therefore, the moving between the open position and the closed position may be done through manipulation of the threaded rim 22.

Extending from the transparent upper portion 44, through the enclosure and to the lower baffle portion 40 may be a divider 60, generally dividing the enclosure into a first enclosure half 601 and a second enclosure half 602, wherein the first enclosure half 601 is fluidly connected to one baffle aperture 20 and the second enclosure half 602 is fluidly connected to the other baffle aperture 20.

The lid assembly 14 may provide enclosure halves of a known volume along with visible gradation (now shown) so that user may measure out a predetermined amount of contents 28 into the enclosure, effectively measuring the contents 28 therein.

The sidewall 42 and transparent upper portion 44 may rotate relative to the baffle portion 40 so that the positioning of the divider relative to each of the baffle apertures 20 may be adjustable. This may be important for using the divider 60 as a sort of sweeper to push some contents 28 through one or both of the enclosure halves back into the container 26, when in an upright position.

The transparent upper portion 44 may provide removably attachable twist knob 12 that is connected to the lid portion 14 for moving the baffle portion 40 between the open position and the closed position.

Each enclosure half may have a portion of sidewall 42 that provides an opening 18 with a movable cover 16 so that each opening 18 is movable between a closed retaining condition and an open pouring condition for pouring the contents 28 from the adjacent enclosure half through the opening 18. The movable cover 16 can partially cover, close off, the opening 18 so that a user selectively controls the flow of contents 28 in the pouring condition.

Figure 3A:
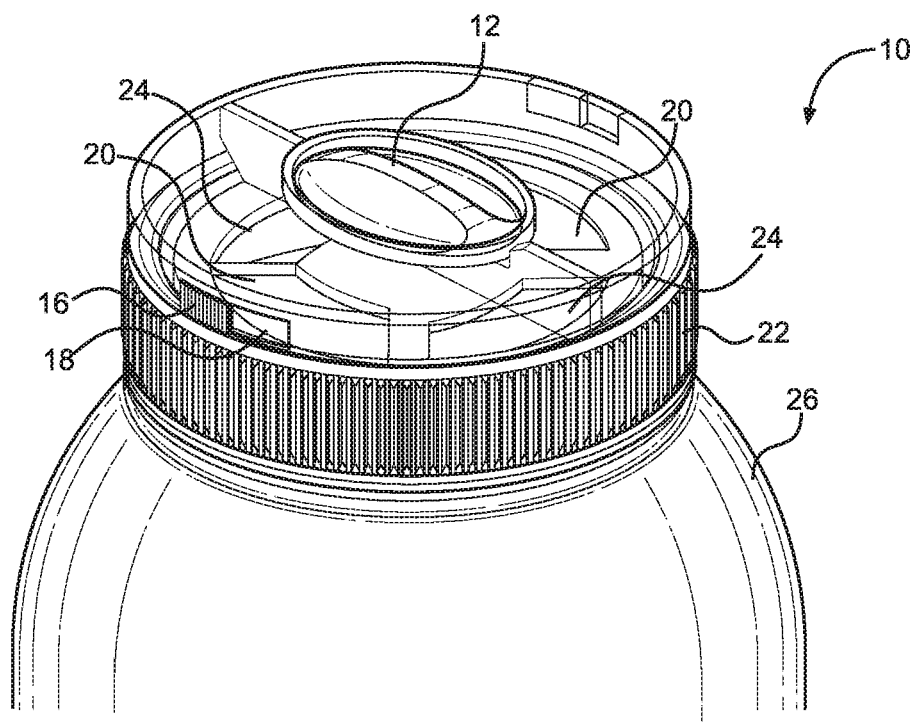
FIG. 3A is a top perspective view of an exemplary embodiment of the present invention in the closed position.
Figure 3B:
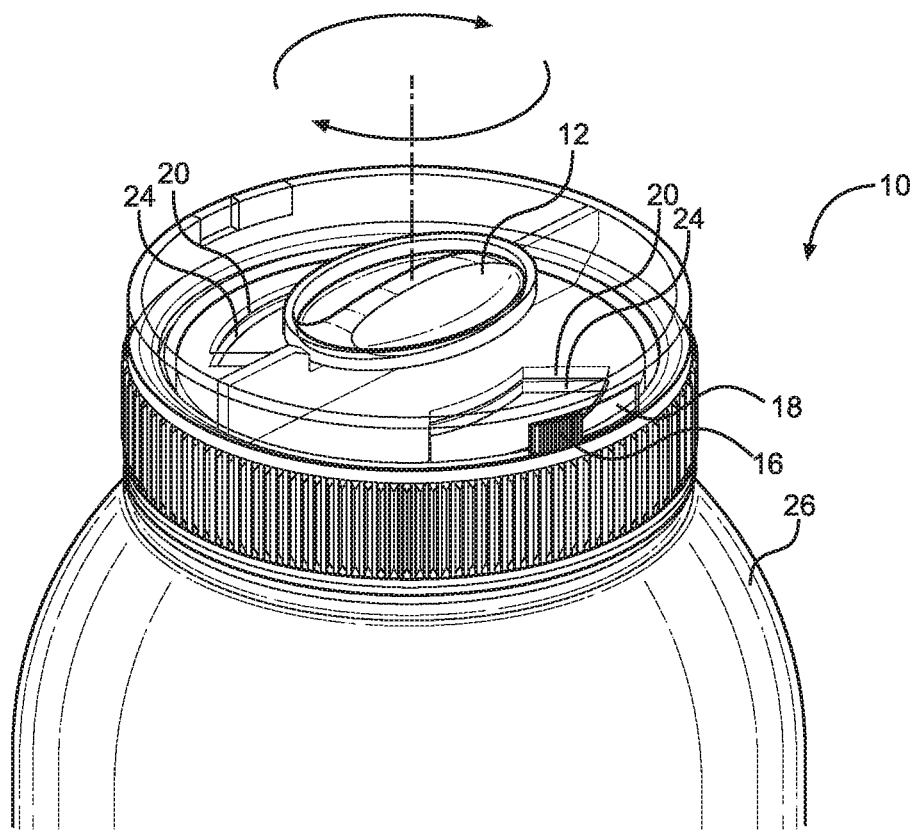
FIG. 3B is a top perspective view of an exemplary embodiment of the present invention in the open position.
Figure 3C:
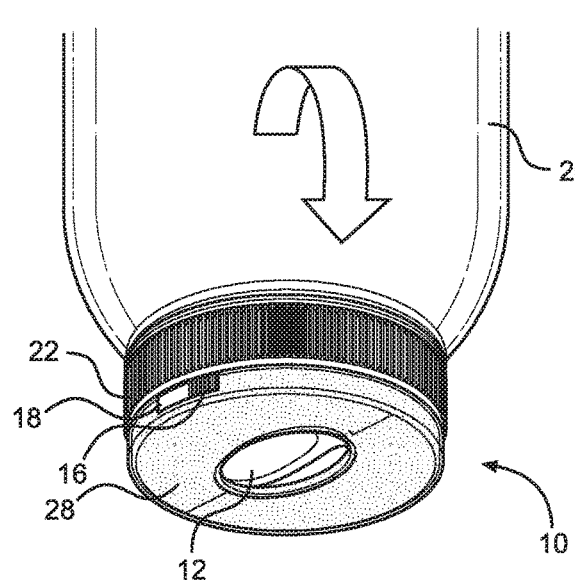
FIG. 3C is a perspective view of an exemplary embodiment of the present invention shown in use.
Figure 3D:
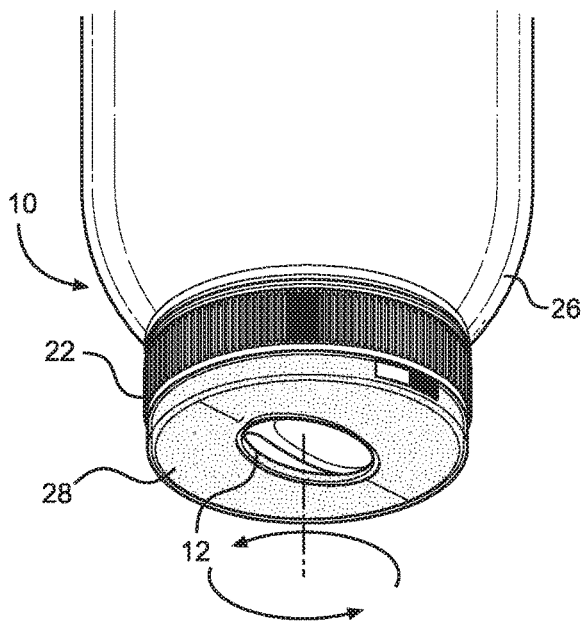
FIG. 3D is a perspective view of an exemplary embodiment of the present invention shown in use.
Figure 3E:
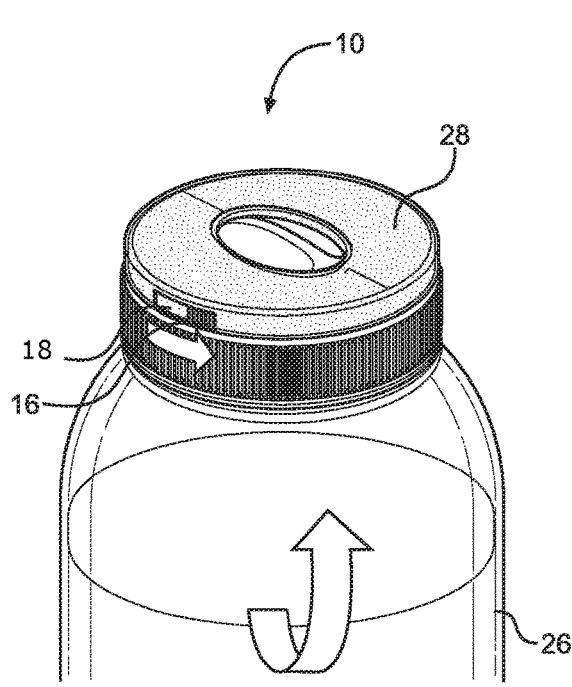
FIG. 3E is a perspective view of an exemplary embodiment of the present invention shown in use.
Figure 3F:
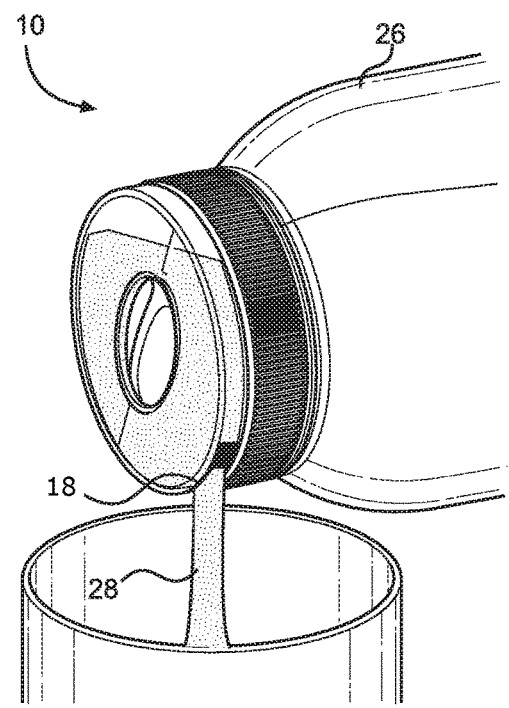
FIG. 3F is a perspective view of an exemplary embodiment of the present invention shown in use.

A method of using the present invention may include the following. The powder dispensing system 10 disclosed above may be provided. In the open condition, the container 26 may be turned upside down so that a portion of the contents 28 flows from the container 26 to one or more of the enclosure halves. When the portion of the contents 28 in the enclosure is sufficient for the user, the user may manipulate the twist knob 12 so that the lid assembly 50 is in the closed position before moving the container 26 to its upright position. Then the user may move one of the movable covers 16 to the pouring condition and pour the contents 28 from the associated enclosure half into another vessel, such as a cup, as illustrated in FIG. 3F. The user may do the same process for the other enclosure half, if desired.

It should be understood, of course, that even though the above disclosure illustrates powder—and may make specific reference to protein powder for pre- or post-workout consumers—that the present invention may be used for all powder substances, as well as all appropriate fluids and liquids in need of predetermined measured separation from the underlying container 26; for example, for applications such as, but not limited to, medical applications, chemical applications, pharmaceutical applications, etc.

It should be understood, of course, that the foregoing relates to exemplary embodiments of the invention and that modifications may be made without departing from the spirit and scope of the invention as set forth in the following claims.

What is claimed is:

1. A dispensing system for a container, comprising:
   a septum portion dimensioned to entirely cover an opening of the container but for two or more spaced apart septum apertures provided along the septum portion; and
   a lid assembly, comprising:
      an enclosure defined by a baffle portion, a sidewall, and a transparent upper portion;
      the baffle portion providing two or more spaced apart baffle apertures fluidly connected to the enclosure, each baffle aperture coextensive one of the two or more spaced apart septum aperture;
      the lid assembly rotatably movable relative to the septum portion between a closed position and an open position wherein each baffle aperture aligns with one of the two or more spaced apart septum aperture;
      one or more wall openings provided along the sidewall and fluidly coupled to the enclosure;
      an opening cover associated with each wall opening, each opening cover movable between a pouring condition and a retaining condition preventing a flow through the wall opening; and
      a divider extending between the baffle portion, the sidewall, and the transparent upper portion, wherein the divider divides the enclosure into a first enclosure half and a second enclosure half, wherein the divider separates at least one of the two or more spaced apart baffle apertures from another of the two or more spaced apart baffle apertures.

2. The dispensing system for a container of claim 1, further comprising:
   a twist knob removably attachable to the transparent upper portion.

3. The dispensing system for a container of claim 1, further comprising:
   a rim connecting the septum portion to the container.

4. The dispensing system for a container of claim 3, wherein the rim connects the baffle portion to the container.

5. The dispensing system for a container of claim 4, further comprising a lip along an upper inner periphery of the rim, the lip connecting the baffle portion to the container.

6. The dispensing system for a container of claim 1, wherein each enclosure half has one wall opening of the one or more wall openings fluidly coupled thereto.

* * * * *